United States Patent [19]

Norton et al.

[11] 3,921,946

[45] Nov. 25, 1975

[54] VEHICLE SPEED CONTROL ARRANGEMENT

[75] Inventors: David John Norton; John Douglas Corrie, both of London, England

[73] Assignee: Westinghouse Brake & Signal Co. Ltd., London, England

[22] Filed: July 23, 1974

[21] Appl. No.: 491,531

[30] Foreign Application Priority Data

Aug. 18, 1973 United Kingdom .............. 39147/73

[52] U.S. Cl. ...... 246/182 A; 246/182 B; 246/187 B

[51] Int. Cl.² ............................................ B61L 3/08

[58] Field of Search ........ 246/182 B, 182 A, 182 C, 246/187 B; 187/29 R; 235/150.2, 150.24; 180/105; 105/61; 317/5; 104/149, 152; 340/248 A

[56] References Cited

UNITED STATES PATENTS

| | | | |
|---|---|---|---|
| 3,300,639 | 1/1967 | Bowman | 317/5 |
| 3,341,816 | 9/1967 | Davis | 340/248 A |
| 3,351,927 | 11/1967 | Stinson | 340/248 A |
| 3,519,805 | 7/1970 | Thorne-Booth | 246/182 B |
| 3,566,103 | 2/1971 | Wilcox | 246/182 B |
| 3,639,754 | 2/1972 | Kovalcik | 246/182 B |
| 3,655,962 | 4/1972 | Koch | 235/150.2 |
| 3,790,778 | 2/1974 | Oster | 105/61 |

FOREIGN PATENTS OR APPLICATIONS

| | | | |
|---|---|---|---|
| 721,434 | 11/1965 | Canada | 246/182 B |
| 972,859 | 10/1964 | United Kingdom | 246/182 B |

*Primary Examiner*—George E. A. Halvosa
*Assistant Examiner*—Reinhard Eisenzopf
*Attorney, Agent, or Firm*—Larson, Taylor and Hinds

[57] ABSTRACT

A vehicle speed control arrangement with particular but not exclusive utility for bringing railway vehicles to a stop, e.g. at a station platform. A speed/distance retardation profile is contained in vehicle-mounted "look-up" read-only memories which are initiated into controlling the vehicle brakes by passing a fixed track-side marker. Profile deviation limits are initiated or inhibited to idealise the stopping procedure in respect of limitation of the number of braking level changes, minimising braking time to save total journey time, maximising passenger comfort, and repeatable accuracy of stopping.

39 Claims, 8 Drawing Figures

FIG. 4

Figure 1:
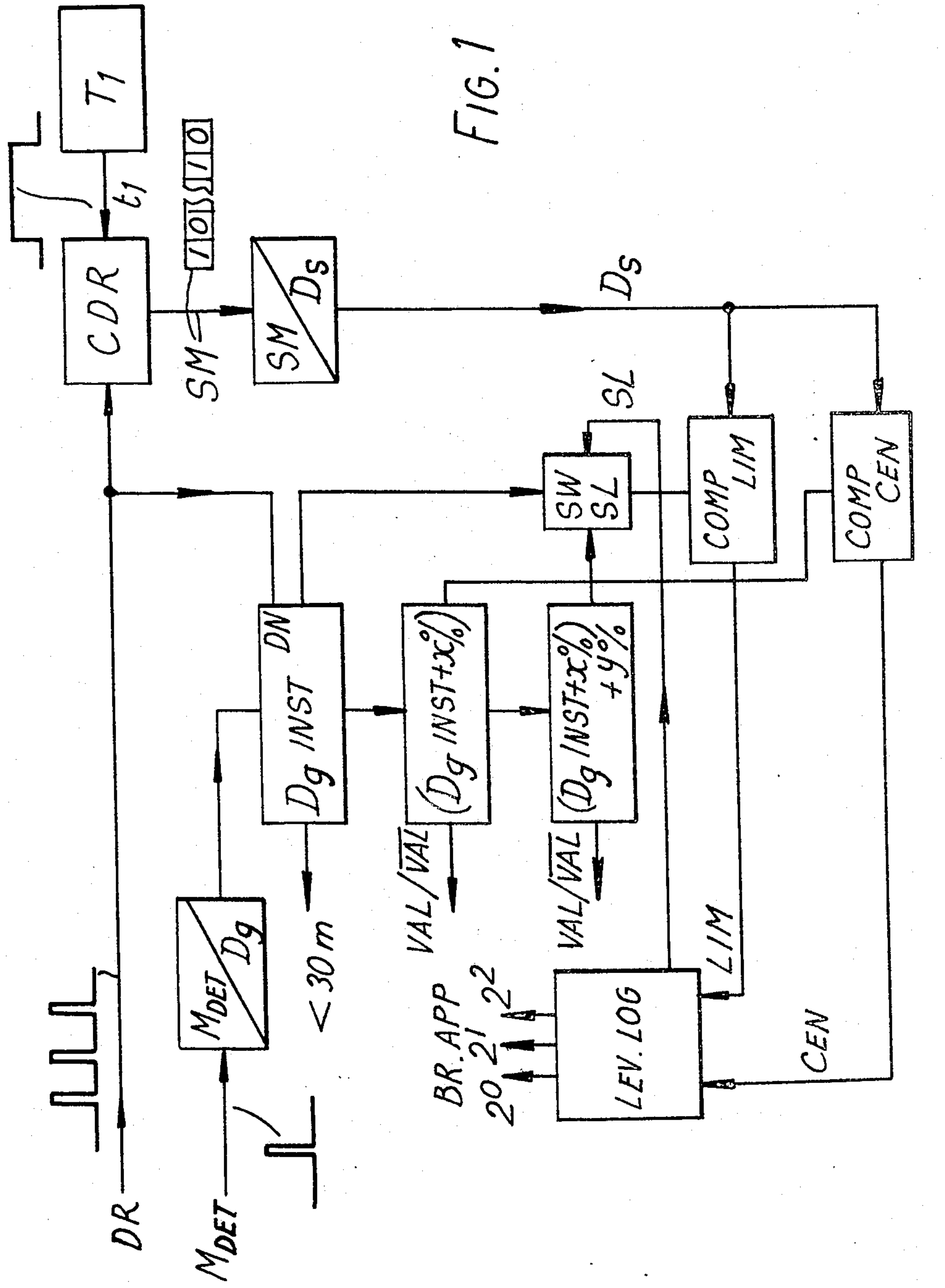

| DS COD (8 BIT) | | | | | | | | DS (12 BIT) | | | | | | | | | | | |
|---|---|---|---|---|---|---|---|---|---|---|---|---|---|---|---|---|---|---|---|
| EXP | | | MANT | | | | | M.S.D. | | | | | | | | | | | L.S.D. |
| A | B | C | D | E | F | G | H | O | P | Q | R | S | T | U | V | W | X | Y | Z |
| 0 | 0 | 0 | D | E | F | G | H | 0 | 0 | 0 | 0 | 0 | 0 | 0 | D | E | F | G | H |
| 0 | 0 | 1 | D | E | F | G | H | 0 | 0 | 0 | 0 | 0 | 0 | 1 | D | E | F | G | H |
| 0 | 1 | 0 | D | E | F | G | H | 0 | 0 | 0 | 0 | 0 | 1 | H | D | E | F | G | H |
| 0 | 1 | 1 | D | E | F | G | H | 0 | 0 | 0 | 0 | 1 | G | H | D | E | F | G | H |
| 1 | 0 | 0 | D | E | F | G | H | 0 | 0 | 0 | 1 | F | G | H | D | E | F | G | H |
| 1 | 0 | 1 | D | E | F | G | H | 0 | 0 | 1 | E | F | G | H | D | E | F | G | H |
| 1 | 1 | 0 | D | E | F | G | H | 0 | 1 | D | E | F | G | H | D | E | F | G | H |
| 1 | 1 | 1 | D | E | F | G | H | 1 | H | D | E | F | G | H | D | E | F | G | H |

FIG. 6

| COMP CEN, CEN VAL/$\overline{VAL}$ | COMP LIM LIM VAL/$\overline{VAL}$ | REL LEV | BR. APP | | |
|---|---|---|---|---|---|
| | | | $>S_1$ | $<S_2$ | 30m $<S_2$ |
| 0 OR $\overline{VAL}$ | 0 OR $\overline{VAL}$ | — | 0 | 0 | 2 |
| 0 AND VAL | 1 AND VAL | A | 4 | 3 | 2 |
| 1 AND VAL | 0 VAL | B | 5 | 4 | 2 |
| 1 OR $\overline{VAL}$ | 1 VAL | C | 6 | 5 | 2 |

VEHICLE SPEED CONTROL ARRANGEMENT

This invention relates to a vehicle speed control arrangement.

According to the invention there is provided a vehicle speed control arrangement comprising a distance/-speed inter-relationship profile storage means containing signals representing desired vehicle reference speed values at particular reference distance values from a predetermined vehicle position at which the distance/-speed profile is to be applied to the control of the vehicle, vehicle speed determining means coupled to the vehicle to determine the actual speed thereof, vehicle travel distance determining means coupled to the vehicle to determine the distance which the vehicle has travelled past said predetermined position, comparison means coupled to said speed determining means and to said travel distance determining means to compare the actual speed/travel distance ratio with the desired value stored in said storage means to produce a resulting comparison, and vehicle speed control means coupled to said vehicle to control the vehicle speed in accordance with said resulting comparison to maintain the vehicle speed in relation to distance travelled past said predetermined position to within predetermined variations from said profile.

Said profile may be a braking profile, and said speed control means may comprise at least one braking system of the vehicle coupled to the vehicle to reduce the vehicle speed upon receipt of braking signals from the comparison means.

Said predetermined variations may be predetermined upper and lower limits of deviation from said profile, the speed control means including means for bringing the vehicle speed in relation to distance travelled past said position back within said limits should they be exceeded.

The limit deviations may be separated from the profile by a respective percentage of the speed at the appropriate distance for the respective part of the profile. The resulting comparison represents one of these four conditions; (a) the reference value is beyond one limit value; (b and c) between a limit and the centre value; or (d) beyond the other limit value.

The comparison means may include two comparator circuit elements one responsive to one or both of the reference values and the respective measured value or values, the other to a selected one of the limit values and the reference values. The limit value may be selected by a switch responsive to the one comparator giving an indication on which side of the reference value the measured value lies.

Each of the four conditions may be represented by a combination of the comparator outputs of a one-bit binary signal and a validity signal, the state of the binary signal indicating which value is the greater and the validity signal indicating whether or not the comparison is valid.

The plurality of distance values may be produced by adding in appropriate binary adders respective percentages of a binary value representing the smaller limit distance. The smaller limit distance value may be supplied from a memory on one or more occasions and corrected in a counter holding the value for movement of the vehicle by pulses representing units of distance travelled generated by a vehicle motivated (for example wheel or axle driven) tachometer. The distance to a required stopping point for the vehicle and this distance may be measured by counting down the known distance from a marker positioned before the stopping point.

The reference value may be contained in a further memory. The value may be in digital form and the value appropriate to an instant in time or a position of the vehicle selected from values stored in the memory. The selection may be caused by a signal representing the instantaneous measured value of another parameter, the value selected being in accordance with a desired relation between the one parameter and said another parameter. The one parameter may be distance and said another parameter the measured speed of the vehicle. The distance may be the distance required to stop from the measured speed at a selected degree of braking. The speed may be measured from the "distance travelled" pulses.

The distance may be represented by a coded binary signal having two components, an exponent and a mantissa, the mantissa representing the sufficient number of significant figures in the binary value of the distance and the exponent the order of the most significant figure of the mantissa.

The distance represented by the distance-travelled pulses may be corrected for mechanical errors in the accuracy of their generation by a calibration means responsive to the number of pulses in a known externally indicated distance travelled to adjust the distance assigned to each pulse. The calibrator may be a binary rate multiplier whose multiplication ratio is that ratio required to adjust the distance assigned. The ratio may be derived from a store in response to an input of the number of pulses recorded in the known distance.

The measured distance to the stopping point may be derived from an approximate value stored on the vehicle, said value being corrected with information derived from trackside markers. A circuit to apply the correction may include means responsive to a first marker to insert said approximate value, which is of the distance of the first marker from the stopping point, into an up/down counter means responsive to pulses representing unit distance travelled to reduce the value in the counter until the second marker, at a known fraction 1/N of the distance of the first marker from the stopping point is detected and means to derive (N−1) times the difference between the reduced value and the approximate value as the measured distance from the second marker.

The measured distance may also be derived by a circuit responsive to identifiable trackside markers to supply a value of measured distance appropriate to an identified marker as said smaller limit distance.

The degree of speed regulation may be determined by said percentages setting, the limit values being chosen as less than the variation of speed obtained by a step-change in the selected braking level.

When the control arrangement is required to bring the vehicle to a chosen stopping point the reference value may be the distance to the stopping point at the instantaneous vehicle speed for a chosen brake level. The relation of speed and distance for the chosen brake level is called the "profile".

The profile may be stored in a profile memory which may have alternative parts each appropriate to a different type of vehicle path. When the path is a railway track the types may be various gradients and the parts may be combined to produce a profile appropriate to a track being traversed. The combination may be produced in response to an external signal or a signal stored on the vehicle. The distance stored in the profile memory may be encoded in the form described above.

The speed applied to the profile memory to generate the encoded distance may be derived from the distance-travelled pulses corrected for mechanical errors.

The degree of speed regulation may be by a selected one level at a time of a multi-level brake effort. The level may be derived from the outputs of the comparators in accordance with the condition indicated. There may be a logic circuit responsive to the binary and validity signals to select the level required relative to the level chosen for the profile. The relative level may be converted to an actual level by a further logic circuit in response to the relative level and the measured speed.

The actual level may be put into effect or delayed by a calculating circuit. The delay may be to prevent an initial brake application below the profile level and subsequently to prevent a change in brake level until a certain deceleration from a previous change in level occurs. The actual level may be put into effect via a latch set to the level.

Figures 2, 3:
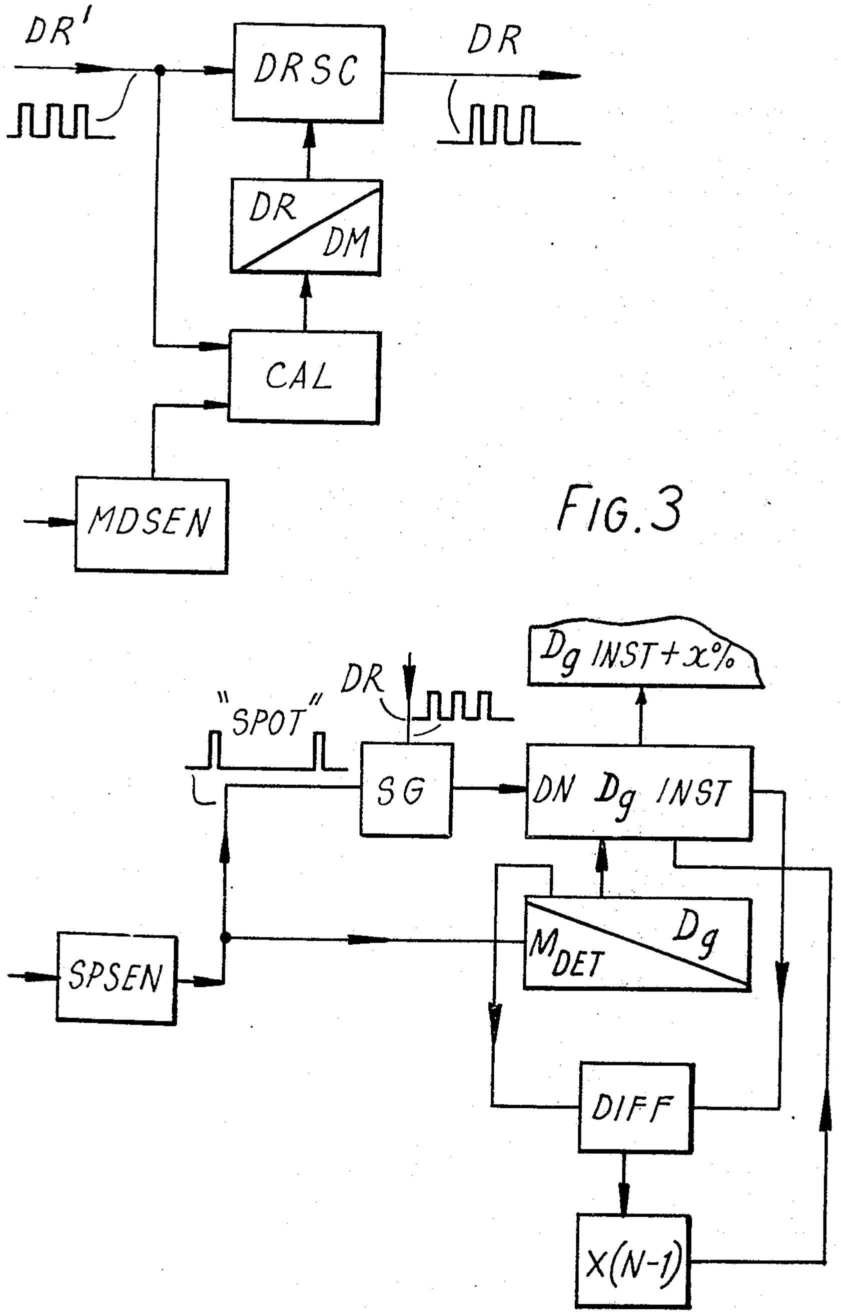
Figure 5:
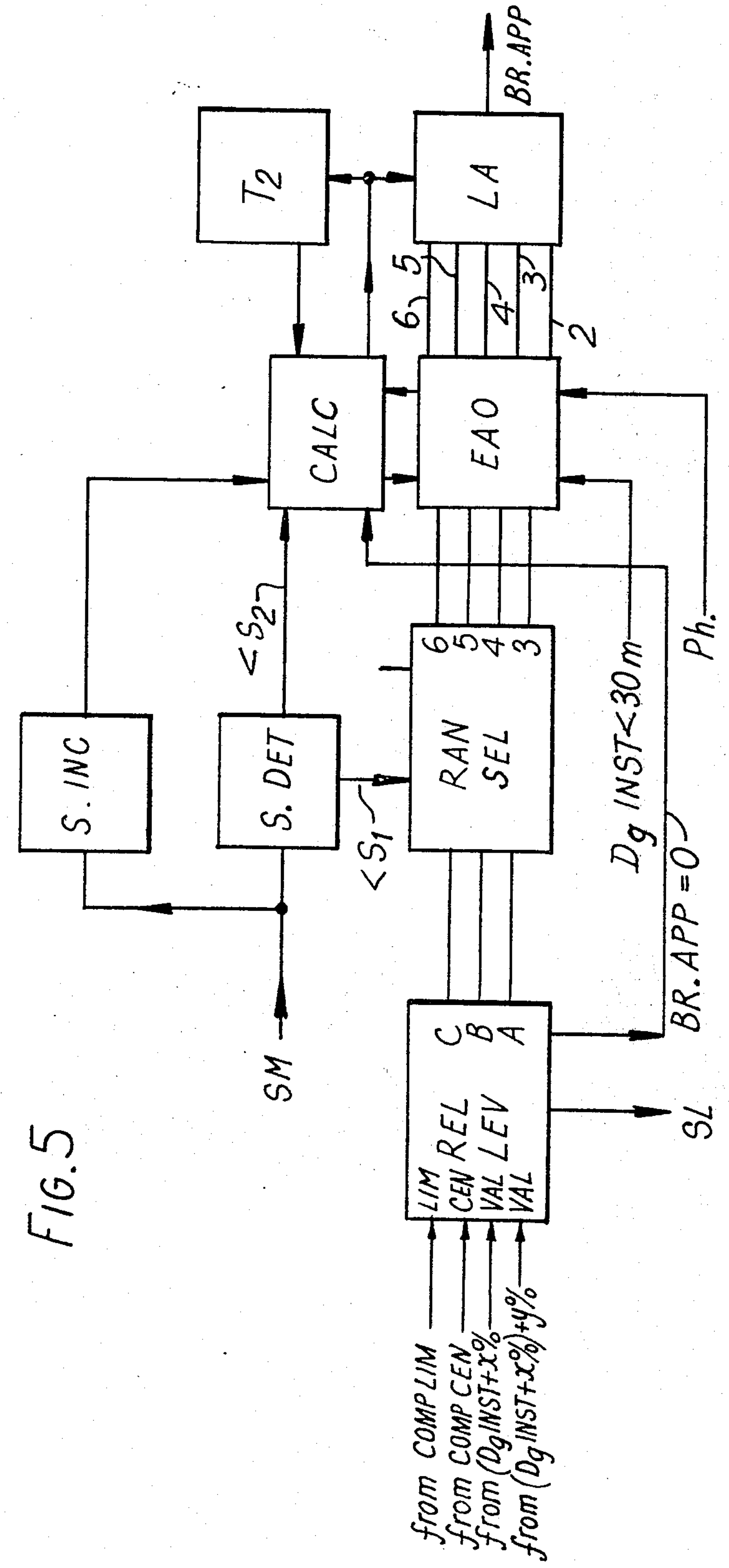
Figure 7:
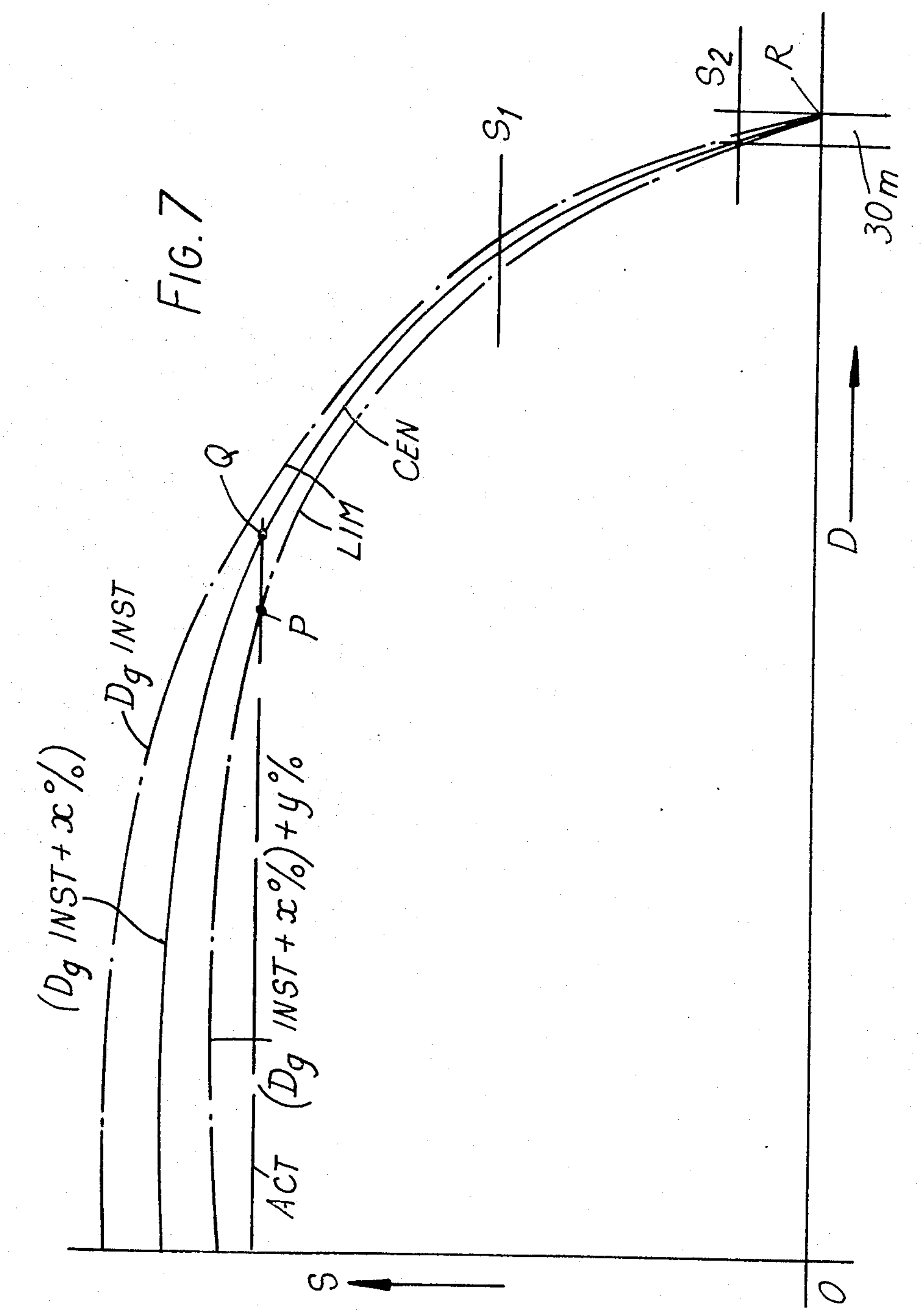
Figure 8:
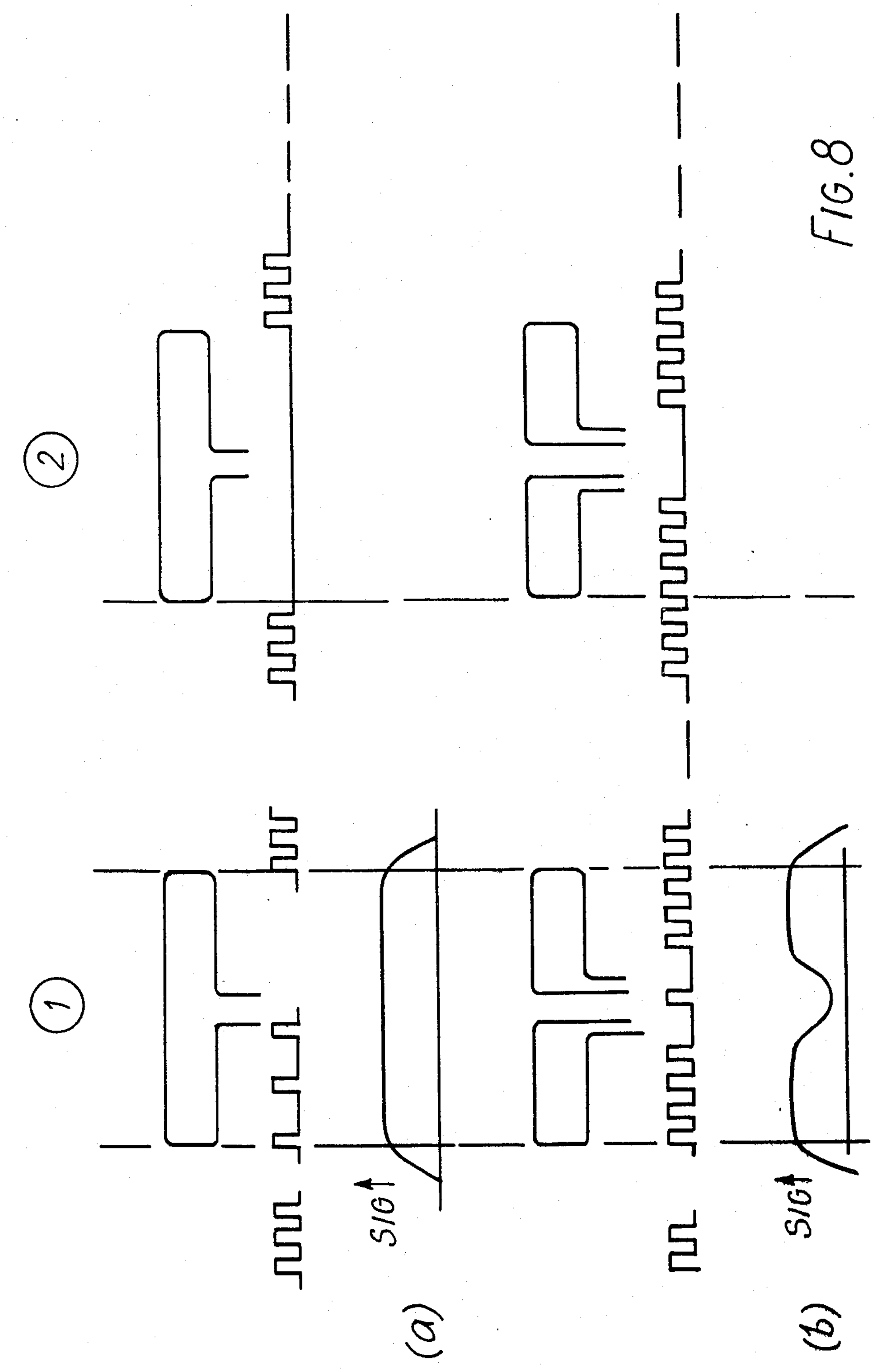

Embodiments of the invention will now be described by way of example with reference to the accompanying drawings in which:

FIG. 1 is a block schematic diagram of a vehicle speed control arrangement with braking level selection, FIGS. 2 and 3 are block schematic diagrams of circuits usable with the arrangement of FIG. 1, FIG. 4 is a table referred to in the description, FIG. 5 is a block schematic diagram of one form of a part of FIG. 1, FIG. 6 is a truth table relating to FIG. 5, FIG. 7 is a graph showing a control profile, and FIG. 8 is a diagram of two forms of marker.

The arrangement will be described with reference to its application to control a railway train to stop at a selected point along a platform with a repeatable accuracy in the order of 20 to 50 centimeters. The tailway track is presumed to be equipped in advance of the platform with at least one fixed marker recognisable by equipment on the train so as to indicate that the train is a certain distance in advance of the selected stopping point.

The arrangement includes various circuit elements represented in the drawings by labelled blocks. Many of these are circuits which can be bought "off-the-shelf" in integrated circuit form and their nature and construction will be readily apparent to those skilled in the art. Accordingly no detailed description is believed to be required although any special features will be noted.

FIG. 1 shows an important part of the arrangement in which a brake application level is selected in accordance with the relationship of the speed and position along the track of the train and a desired speed position profile.

A signal DR which represents the distance the train moves along the track is generated in any suitable manner, e.g. by a wheel driven tachometer on an underbraked or un-braked wheel or axle.

The signal DR is in the form of a regular succession of pulses and these are supplied to a counter CDR which counts the number of these pulses in a given interval of time $t_1$ as timed by a timer $T_1$, to provide an output signal SM of binary word form conventionally indicated in FIG. 1. Signal SM represents the speed of the train, being the measured total distance travelled in the known time $t_1$. Signal SM is applied as an input to a store SM/$D_s$. This store is preferably a read-only memory (r.o.m.) used as a "look-up table" set-up to provide an output of a binary word $D_s$ representing a distance for an input, SM, representing speed. The relation between input and output is that of a profile relating the distance of the train from the selected stopping point to the speed at which the train should be travelling to achieve the desired accuracy of stopping. This output $D_s$ is a reference value of the parameter distance, viz: "required distance to the stopping point."

A further input to the part of the arrangement shown in FIG. 1 is a signal $M_{DET}$. This signal indicates that the train has passed a marker set at a fixed predetermined distance before the stopping point. For clarity at this stage of the description it will be assumed that the signal $M_{DET}$ relates to the only marker which is set at a known distance before the stopping point, and is conveniently a single pulse. (Later description will refer to the use of more than one marker). This single pulse release from store $M_{DET}/D_g$ a parallel-coded signal $D_g$ representing the distance from the marker to the stopping point. This signal $D_g$ is supplied to a counter $D_g$INST and sets this counter to represent this distance at the instant the marker is passed. Counter $D_g$INST can be counted down by pulses applied to a counter terminal DN. Accordingly each pulse of the signal DR applied to the terminal DN will reduce the value of the count in the counter and, assuming the pulses of the signal DR are compatible with the word $D_g$ the contents of counter $D_g$INST will be the measured instantaneous value of the parameter distance, viz: "distance to the stopping point". In practice, to simplify the provision of the feature next to be described, the value in counter $D_g$INST has to be increased by $x\%$ to equal the actual value, so the output of $D_g$INST is less than the distance as measured.

The count value in the counter $D_g$INST is applied in parallel-coded form to a binary full-adder "($D_g$INST + $x\%$)". This adder increases the value supplied from $D_g$INST by $x\%$ so that the distance actually measured as remaining is the value of the output of the adder ($D_g$INST + $x\%$). This output is applied in parallel-coded form to a further binary full-adder "($D_g$INST + $x\%$) + $x\%$". This further increases the value by $y\%$ so that the output of ($D_g$INST + $x\%$) + $y\%$ is greater than the distance as measured. The effect of these last three circuit elements is to produce a range of three values in a known relationship for the distance to the stopping point as measured. The outer values are called the "limit" values and the middle value the "centre" value. These values are in the form of parallel-coded signals. The centre value is applied to one input of a comparator COMP CEN. Other ways of achieving this result for example by the use of three separate comparators will be readily apparent to those skilled in the art but the preferred method is that which is illustrated.

The limit values are applied to a data switch SWSL which can be operated by a control signal SL to apply one or other limit value to one input of a comparator COMP LIM. The reference value $D_s$ is applied the other input of both comparators. Each comparator supplies an output signal which is one of two conditions. If the measured value input is more than the reference value input the output is a binary "zero", and if less than the reference input, a binary "one".

The outputs of the comparators are applied to a logic circuit LEV LOG which generates, inter alia, the control signal SL. The logic of LEV LOG is such that switch SWSL is operated to connect the output of the adder $D_g$INST to the comparator COMP LIM until the comparator COMP CEN indicates by an output change to binary one that the output of the adder ($D_g$ INST$+x\%$) is below the reerence value whereupon the output of the counter ($D_g$INST $+ x\%) + y\%$ applied to the comparator COMP LIM to determine whether the measured distance to the stopping point is sufficiently smaller than the distance required by the profile at the existing speed SM to need a higher degree of braking (see FIG. 6 below). This logic also enables the determination, from the condition of a binary one from both comparators, that the measured distance is so much less than that required by the profile at the existing speed SM to require the application of a higher degree of braking.

In the preferred embodiment the arrangement controls, by an output signal BR.APP, a brake apparatus whose braking effort is expressed in a 3-bit binary word giving seven levels of braking. However other types of brake apparatus may be used although it is preferable that identifiable and repeatable levels of braking can be selected so that the correction of the stopping of the train to accord with the required profile corresponds to the error in the measured distance represented by the percentages $x$ and $y$, which represent the deviations from profile at which corrective action is required.

To summarise the part of the arrangement described above, the speed of the train as it is braked on approach to a stopping point is measured and the instantaneous distance the stopping point at that speed for a desired stopping profile is retrieved from a store. By subtracting measured distance run since passing a marker from the known distance of the marker from the stopping point the distance left to the stopping point is deduced. This distance is increased and decreased by known amounts to provide high limit, centre and low limit values of the measured distance left. The measured values are compared with the stored value. If the stored value is less than the measured low limit the train is slowing much too quickly and will not reach the stopping point. Accordingly a very low brake level or none at all is selected. Similarly if the stored value is between the low limit and centre a brake effort reduced by the braking effort change represented by the distance decrement is called for. It will be apparent that for the next higher value of distance the profile braking is called for and that if the measured distance exceeds the available distance appropriate extra braking will be applied.

In the above description it has been assumed that the signal DR is exactly accurate. However it is well-known that the generation of an accurate signal is not easy and to such a signal is required to achieve the stopping point accuracy proposed above.

FIG. 2 shows signal generator which advantageously forms part of the inventive arrangement.

Signal DR′ represents the raw output of a wheel or axle driven tachometer, each pulse representing a given distance travelled by the train. The accuracy of this signal, in units of travel length/pulse, depends on the mechanical condition of the wheels etc. of the vehicle. If these wear, the unit of length varies. Accordingly it is proposed to calibrate the pulses on the approach to a stopping point so that the accuracy of the speed and distance measurements on which stopping point control is based is enhanced.

Two trackside markers are provided a known distance apart and a circuit MDSEN to sense these is mounted on the train. Upon the sensing of each marker, the circuit MDSEN provides a pulse as an input to a calibration circuit CAL which includes a counter which is supplied with pulses of the signal DR′. The counter is started and stopped by the markers in turn to count the number of pulses of DR′ generated in the known distance. This number, in the form of a binary word, is supplied to an r.o.m. DM/DR in which correction factors appropriate to the numbers of pulses counted in the measured distance are stored. The correction factors are 12-bit binary words which determine the scaling factor of a binary rate multiplier (b.r.m.) DRSC. Multiplier DRSC will thus scale the pulse rate DR′ applied at its input to compensate for mechanical errors so that pulse rate DR at the multiplier output is in accordance with the measured distance.

Thus the pulse signal DR in FIG. 1, from which measured speed and distance run are derived, is compensated for mechanical deviations of the vehicle from nominal values (e.g. those due to wheel wear).

Another part of the arrangement is shown in FIG. 3. This is a preferred form of the means to provide the marker detection signal $M_{DET}$ of FIG. 1. This signal indicates that the train is at a specific distance from the stopping point.

Two trackside markers or "spots" are provided. The first marker is at the beginning of the "profile" stopping distance and the second marker is separated from the first by a fraction 1/N, say ⅓, of the stopping distance. As in FIG. 1 the DR signal pulses can count down the count in counter $D_g$INST but a gate SG is introduced into the path of the pulses. As spot sensor SP SEN produces pulses on the sensing of each spot, the first spot pulse opens gate SG to signal DR and the second spot pulse closes gate SG. Thus counter $D_g$INST is decremented by the number of pulses representing an exact fraction 1/N of the total distance. Counter $D_g$INST is initially supplied with a distance count of the approximate stopping distance by store $M_{DET}/D_g$ in response to the first spot pulse. Thus after the second spot pulse the difference between the distance counts in $D_g$INST and $M_{DET}/D_g$ will be exactly 1/N of the total stopping distance. A difference circuit DIFF determines this difference and supplies it to an $X$ times multiplication circuit "X(N−1)". The output of the multiplier X(N−1) is a count representing the true total stopping distance and this count is inserted into the counter $D_g$INST in place of the previous approximate value. As explained above a proportionally reduced count may be used to ease the generation of the centre and limit values.

As so far described only one stopping profile is stored in memory $SM/D_s$. However more than one such memory may be used and the appropriate one for a particular form of track selected at the time by e.g. a way-side control signal. Thus a falling gradient approach may be distinguished from a rising one. Alternatively a profile may be synthesised in sections each selected from a store of alternatives. Such operations will be readily appreciated and if required, put into effect by those skilled in the art without further instruction.

An important feature of the arrangement is that the profile is stored in digital form. Thus a binary speed word will release from store the exact distance related to the speed. By way of comparison in an analogue equipment there is always some uncertainty and possible inaccuracy as the output for a given input may not be consistent, and accuracy and consistency are of prime importance for the purposes of the present invention.

To achieve adequate accuracy even with digital signals distance may have to be represented by 12 bits in a basic binary number form. This is because of the range of size of the values. However FIG. 4 shows a table by use of which 8 bits can encode a 12-bit word with adequate accuracy. The use of "exponent" and "mantissa" form allows the order of the significant digits to be encoded and save on digits that would be zeros or insignificant.

In a preferred form of the arrangement five significant binary digits are in the mantissa and the 3 bits of the exponent determine the order of the most significant of these. A binary one can be derived from the exponent in other than the "all zeros" form to provide six effective binary digits. Referring to FIG. 1 the decoding would be performed in circuit SM/$D_s$. Signal SM will release from the appropriate profile memory the 8-bit word encoding the value, $D_s$COD, of the distance required to stop. This 8-bit word is then decoded by a logic circuit operating according to FIG. 4 to produce the 12-bit word $D_s$ with the distance in binary form. It will be seen from the table in FIG. 4 that the less significant digits in excess of six are a repetition of the more significant digits. This simplifies the logic circuit and does not affect the accuracy of the arrangement as the seventh and lesser digits do not represent a significant fraction of $D_s$ whether one or zero is assigned to them.

Brief reference has been made to the manner of controlling the actual degree of braking. Although various ways of exercising control will be apparent to those skilled in the art the following is a preferred form and is shown in FIG. 5.

FIG. 5 is a more detailed diagram of the block LEV LOG of FIG. 1. The signals for the range of values of "distance to go" each includes an indication VAL/$\overline{\text{VAL}}$ that the result of the comparison is "valid" or "not valid". For example when $D_g$INST is all binary ones that increase of $x$% could cause an "overflow" which would be lost leaving an apparently smaller value for ($D_g$INST $= x$%). The absence of a valid signal in this situation prevents an unnecessary brake application. The first block of FIG. 5, REL LEV is supplied with the outputs of the comparators and the validity signals. The block REL LEV performs a logical operation on the basis of this information in accordance with the table in FIG. 6. The four left-hand columns show the four possible conditions of the comparator outputs and their validity or otherwise due to overflow.

Considering these when a comparator output is binary 0 but output is not valid the remaining distance is apparently less than that required but overflow has occurred and the distance is sufficient. If both the central and lower limit are 0 and invalid the distance is sufficient to require no braking. Thus in FIG. 7 (not to scale) the curve CEN is the required profile and the curves LIM represent conditions one brake step away from the profile. The line ACT represents a train coasting after acceleration. Between the S (speed) axis and point P no brakes are required, the distance available for stopping always being more than that required by the profile and both comparators will have 0 invalid outputs. Between P and Q comparator COMP LIN will have a binary 1, valid output from the ($D_g$INST $+ x$%) $+ y$% value selected by switch SWSL in response to signal SL. Once the intersection Q is reached, braking can be applied.

Accordingly, from FIG. 6, it is seen that a brake application BR APP of relative level A is selected (relative brake levels are A, B and C of increasing degree). The actual level of braking applies is set by circuit RAN SEL once a brake level B has been called for by REL LEV. RAN SEL equates the relative levels A, B C either with brake levels 4, 5, 6 above speed $S_1$ (say 8 mph, 12 kph) or with brake levels 3, 4, 5 respectively below $S_1$ (brake levels are 0 to 7 of increasing degree). The speed is detected by circuit S DET supplied with measured speed signal SM. Accordingly in this example relative level A will be equated with level 4 and this degree of braking will be called for by energising output 4 of circuit RAN SEL. However further control of brake effect is exercised by circuit CALC. This circuit is supplied with another output of detector S DET indicating a lower speed $S_2$ (say 4 mph, 6 kph). A further input indicating that $D_g$INST has a value such that the train is very near the stopping point, e.g. approximately 30 m., is supplied from $D_g$INST to circuit EAO. If the train is within the 30 m. distance and at a speed less than $S_2$ then level 2 braking is applied by circuit EAO to control the "ease out" to point R.

Further restrictions are applied by the circuit CALC. Circuit S.INC supplies an output to CALC which only permits a change in the brake level if circuit S.INC indicates that the speed SM has reduced by specified amount. Timer $T_2$ similarly only permits a change in the brake level if a period $t_2$ (say 1 second) has elapsed since the previous change.

Circuit CALC will however permit the selection of brake level zero (no brakes) or brake level 2 at any time. Circuit CALC also includes arrangements to prevent spurious brake level selection during transistions between binary levels or non-synchronisation of such transitions. Circuit EAO also responds to a phase signal Ph which prevents braking selection from the circuit except during the station stopping phase.

The output of circuit EAO is either one of the five allowed brake levels or zero brake level and passes through a latch LA. A timer $T_2$ is started in response to circuit CALC opening latch LA and times an interval during which no change in the latched level should occur. However, if a change which can override the latching occurs, the timer $T_2$ is restarted.

Reference has been made above to the relation between brake effort and the discrepancy between measured and required distance to stop as indicated by the comparator. In a preferred form of the arrangement the percentages by which the limits are separated from the profile are set within the speed/distance curves that are one brake level removed from the speed/distance curve for the profile brake level. Thus in FIG. 7 the brake level 4 curve would be below curve ($D_g$INST $+ x$%) $+ y$% and the brake level 6 curve above the $D_g$INST curve. In this way a deviation from profile is detected and acted upon before the appropriate changed brake level curve is reached. This provides an "anticipation" of the change in braking required and by immediately applying the change the deviation is reversed before it becomes too large. The speed of the train thus remains substantially within the "window" formed by the limit curves LIM of FIG. 7 right down to the ease-out point.

In practice, a finite time is required for the train brake to come into effect, which means that should the train speed near the stopping point drop below the ($D_g$INST + $x$%) + $y$% level and so cause the brakes to be released, the subsequent exceeding of the now sharply dropping speed/distance profile may cause a re-application of the brakes at a time which in conjunction with the aforesaid delay in their coming into effect, will be insufficient to stop the train before the stopping point has been passed. Therefore it may be preferable to substitute for the aforesaid "$x$%" component of the profile calculation, a more-or-less fixed value related to the brake application time, thereby always to ensure that the train does not pass the stopping point, whatever brake release/application pattern may occur shortly before the stopping point.

Reference has been made above to the "phase" of the operation of the arrangement. In a rapid transit system four basic phases can be defined viz. acceleration from a station to a coasting speed, coasting, deceleration for the next station, and ease-out to a stop. To maximise the frequency of service, acceleration and braking times are kept to a minimum consistent with passenger comfort.

The phase control ensures that the above described control arrangement operates only during deceleration and ease-out phases, the control arrangement being inhibited at other times. it is possible that during the deceleration on approaching a station a train may be brought to a halt by the action of the main control of the railway system, e.g. to avoid collision if another train is in or just leaving the station, or if a passenger has fallen on to the track. It is essential that the stopping accuracy be retained in these circumstances. Thus although the degree of braking required by the main control may exceed that required by the profile due to the need to stop short of the normal stopping point, the distance measurements are unaffected and when the extra degree of braking is removed and the train allowed to re-start, or to increase speed if still moving, a similar situation to the approach along curve ACT to the point P of FIG. 7 will occur and the profile control will again take over when the comparators indicate appropriately.

When the train is passing along the platform and is approaching the stopping point R with a speed below $S_2$ and a distance-to-go of less than 30 m., brake level 2 is applied, as above, and this level is retained as a parking brake when the train is at rest until a signal is received from, say, the main control or the train guard to cause the train to commence to leave the station.

An alternative form of the circuit shown in FIG. 3 will now be described. The store $N_{DET}/D_g$ forms a look-up table of distances from various markers to the stopping point. A spot recognition circuit similar to circuit SP SEN with the facility of identifying which one of several distinct markers has been sensed is required and this causes the store $M_{DET}/D_g$ to generate the appropriate distance signal for application to counter $D_g$INST. The necessary modification of the distance to simplify the "scaling" applied as described above can be incorporated in the stored values. The distinct markers can be positioned along the trackside at intervals to ensure that the distance in counter $D_g$INST is correctly updated as needed to maintain the required stopping accuracy.

Two forms of marker are illustrated diagrammatically in FIG. 8. FIG. 8*a* shows a single-loop track-bed marker, while FIG. 8*b* shows a double-loop track marker. The single-loop marker will in theory produce a symmetrical radiation signal diagram but it is believed that the shunt produced by a conductive vehicle trailing the loop reduces the radiation at the exit end. Accordingly the double loop form of FIG. 8*b* with opposed loops energised to form a central signal null is preferred.

When the marker is the first marker on the track-side then the signals illustrated in part 1 of FIG. 8 can be used. Over the active length of marker *a* or *b* only half the pulses DR (e.g. alternate ones) are counted. The total of this count is distance of the centre of the marker from the last full-rate pulse count. For the first marker in FIGS. 2 and 3 and all markers in the modified form of FIG. 3 in which distinct markers are used this information is all that is required. Accuracy of loop centre location is important as the loop is some 3 m. long and the centre alone correctly indicates the marker position.

In FIG. 8, part 2, the signals for the second marker for the circuit actually shown in FIG. 3 are illustrated. Over the active length of the marker no pulses are counted. When the multiplication by (N−1) is performed the uncounted part of the distance cancels out leaving a correct value for the distance to go to the stopping point.

The control arrangement has been described in the form of a central circuit section and various other circuit sections supplying information. The central section can be put into effect in other ways readily apparent to those skilled in the art and some of these ways are indicated but the invention is not to be limited by this merely exemplary description. Furthermore the other sections may be embodied in various ways to supply the information required.

The control arrangement has been described with reference to the stopping of a train at a specific point of a platform but is suitable for many forms of vehicle such as any form of tracked or otherwise guided vehicle, and to control such vehicles during other types of movement, e.g. for giving precedence to other vehicles at junctions and/or crossings.

Having thus described our invention what we claim is:

1. A vehicle speed control arrangement comprising a distance/speed inter-relationship profile storage means containing signals representing desired vehicle reference speed values at particular reference distance values for a predetermined vehicle position at which the distance/speed profile is to be applied to the control of the vehicle, vehicle speed determining means coupled to the vehicle for determining the actual speed thereof, vehicle travel distance determining means coupled to the vehicle for determining the distance which the vehicle has travelled past said predetermined position, comparison means coupled to said speed determining means and to said travel distance determining means for comparing the actual speed/travel distance ratio with the desired value stored in said storage means to produce a resulting comparison, and vehicle speed control means coupled to said vehicle for controlling the vehicle speed in accordance with said resulting comparison to maintain the vehicle speed in relation to distance travelled past said predetermined position to within predetermined variations from said profile.

2. An arrangement according to claim 1, wherein said profile is a braking profile and said speed control means comprises at least one braking system of the vehicle coupled to the vehicle to reduce the vehicle speed upon receipt of braking signals from the comparison means.

3. An arrangement according to claim 2 wherein the distance for the measured distance value is the distance to a required stopping point for the vehicle.

4. An arrangement according to claim 3 including a distance counter and wherein said distance is measured by counting down the known distance from a marker positioned before the stopping point.

5. An arrangement according to claim 3 wherein the measured distance to the stopping point is derived from an approximate value stored on the vehicle, said value being corrected with information derived from trackside markers.

6. An arrangement according to claim 5 comprising a correction applying circuit including marker responsive means responsive to a first marker to insert said approximate value, which is of the distance of the first marker from the stopping point, into an up/down counter, means responsive to pulses representing unit distance travelled to reduce the value in the counter until the second marker, at a known fraction 1/N of the distance of the first marker from the stopping point is detected and means to derive (N−1) times the difference between the reduced value and the approximate value as the measured distance from the second marker.

7. An arrangement according to claim 5 wherein the measured distance is also derived by a circuit responsive to identifiable trackside markers to supply a value of measured distance appropriate to an identified marker as said smaller limit distance.

8. An arrangement according to claim 1 wherein said predetermined variations are predetermined upper and lower limits of deviation from said profile, the speed control means including means for bringing the vehicle speed in relation to distance travelled past said position back within said limits should they be exceeded.

9. An arrangement according to claim 8 wherein the limit deviations are each separated from the profile by a respective percentage of the speed set at the appropriate distance for the respective part of the profile.

10. An arrangement according to claim 9 wherein the resulting comparison represents one of these four conditions: (a) the reference value is beyond one limit value; (b and c) between a limit and centre value; or (d) beyond the other limit value.

11. An arrangement according to claim 10, wherein each of the four conditons is represented by a combination of the comparator outputs of a one-bit binary signal and a validity signal, the state of the binary signal indicating which value is the greater and the validity signal indicating whether or not the comparison is valid.

12. An arrangement according to claim 4, wherein the degree of speed regulation is determined by said percentages setting, the limit values being chosen as less than the variation of speed obtained by a stop-change in the selected braking level.

13. An arrangement according to claim 8 wherein the comparison means includes two comparator circuit elements, one responsive to one or both of the reference values and the respective measured value or values, the other to a selected one of the limit values and the reference values.

14. An arrangement according to claim 13 wherein the limit value is selected by a switch responsive to the one comparator giving an indication on which side of the reference value the measured value lies.

15. An arrangement according to claim 13 wherein the degree of speed regulation is by selecting one level at a time from several levels of braking effort.

16. An arrangement according to claim 15, wherein the selected one level is derived from the outputs of the comparators in accordance with the condition indicated.

17. An arrangement according to claim 16 including a logic circuit responsive to the binary and validity signals to select the level required relative to the level chosen for the profile.

18. An arrangement according to claim 17 wherein the relative level is converted to an actual level by a further logic circuit in response to the relative level and the measured speed.

19. An arrangement according to claim 18 wherein the actual level is put into effect or delayed by a calculating circuit.

20. An arrangement according to claim 19 wherein the delay is to prevent an initial brake application below the profile level and subsequently to prevent a change in brake level until a certain deceleration from a previous change in level occurs.

21. An arrangement according to claim 18 wherein the actual level is put into effect via a latch set to the level.

22. An arrangement according to claim 8 wherein the plurality of distance values are produced by adding in appropriate binary adders respective percentages of a binary value representing whichever is the smaller limit distance.

23. An arrangement according to claim 22 wherein the smaller limit distance value is supplied from a memory on at least one occasion and corrected in a counter holding the value for movement of the vehicle by pulses representing units of distance travelled generated by a vehicle motivated tachometer.

24. An arrangement according to claim 23, wherein the reference value is contained in a further memory.

25. An arrangement according to claim 24 wherein the value is in digital form and the value appropriate to an instant in time or a position of the vehicle selected from values stored in the memory.

26. An arrangement according to claim 25, wherein the selection is caused by a signal representing the instantaneous measured value of another parameter, the value selected being in accordance with a desired relation between the one parameter and the another parameter.

27. An arrangement according to claim 1 wherein the distance is represented by a coded binary signal having two components, an exponent and a mantissa representing the sufficient number of significant figures in the binary value of the distance and the exponent the order of the most significant figure of the mantissa.

28. An arrangement according to claim 1 wherein the vehicle speed determining means comprises a pulse-producing tachometer and the distance represented by the distance-travelled pulses is corrected for mechanical errors in the accuracy of their generation by a calibration means responsive to the number of pulses in a known externally indicated distance travelled to adjust the distance assigned to each pulse.

29. An arrangement according to claim 28 wherein the calibrator is a binary rate multiplier whose multiplication ratio is that ratio required to adjust the distance assigned.

30. An arrangement according to claim 29 wherein the ratio is derived from a store in response to an input of the number of pulses recorded in the known distance.

31. An arrangement according to claim 1 wherein the profile storage means has alternative parts each appropriate to a different type of vehicle path.

32. An arrangement according to claim 31 said different types of path are paths of different gradients.

33. An arrangement according to claim 32 wherein the path includes a plurality of differing gradients, and selection means are provided for selecting those parts of the profile storage means instantaneously appropriate to the gradient being traversed.

34. An arrangement according to claim 33 wherein said selection means is vehicle-mounted.

35. An arrangement according to claim 33 wherein said selection means is trackside-mounted.

36. An arrangement according to claim 1 wherein said predetermined vehicle position is marked by a track-bed marker to which said vehicle travel distance determining means is responsive in use.

37. An arrangement according to claim 36 wherein said marker is a single loop.

38. An arrangement according to claim 36 wherein said marker is a double loop, and said vehicle travel distance determining means responds in use to passage of the loop centre.

39. An arrangement according to claim 1 wherein said vehicle is a railway vehicle travelling on a pair of spaced-apart rails.

* * * * *